Feb. 15, 1966  G. H. WEAVER, JR  3,235,109
LIFT TRUCK WITH WHEELS MOUNTED ON
A TILTABLE UPRIGHT ASSEMBLY
Filed Aug. 14, 1963
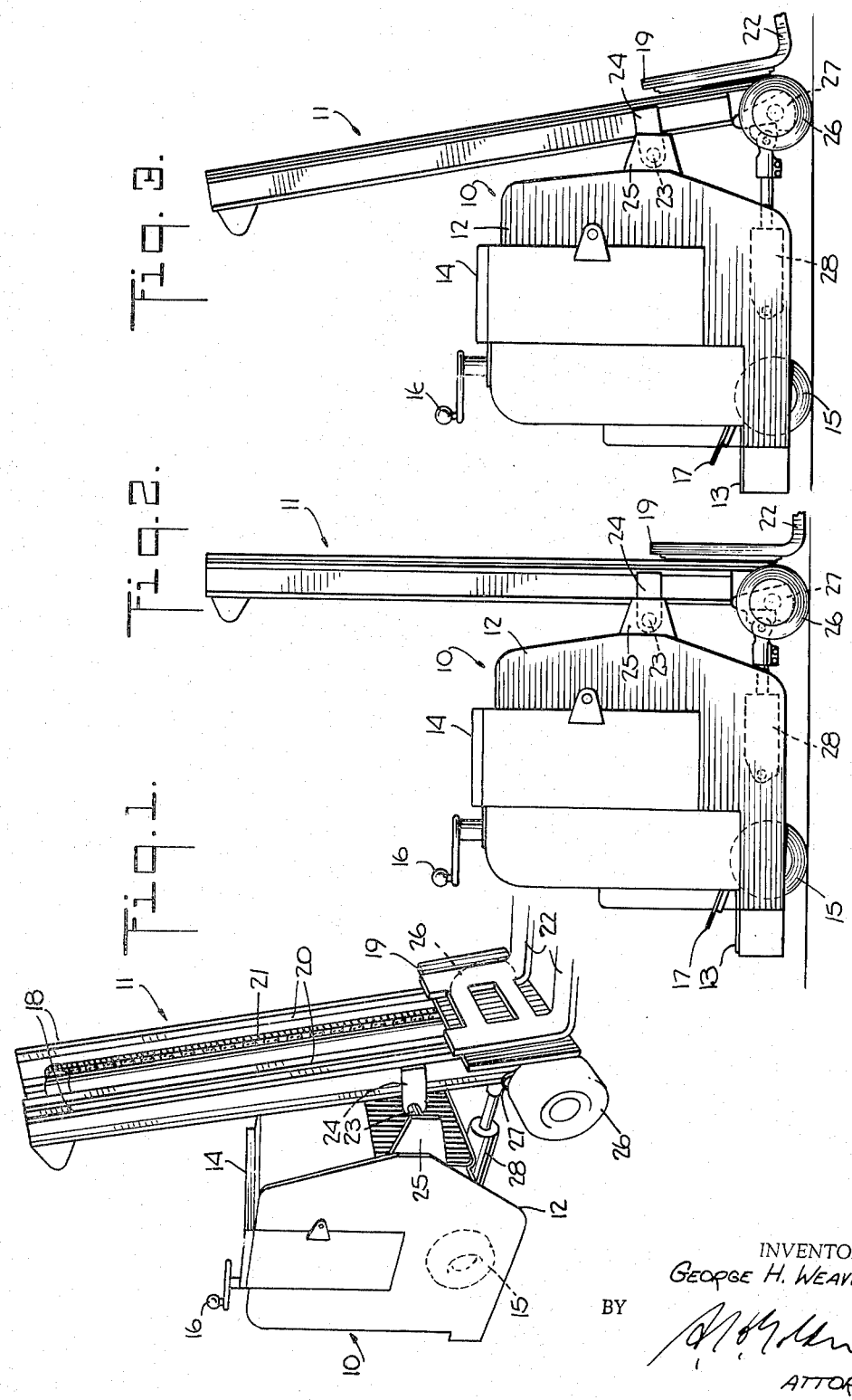
INVENTOR.
GEORGE H. WEAVER, Jr.
BY
ATTORNEY

3,235,109
LIFT TRUCK WITH WHEELS MOUNTED ON A TILTABLE UPRIGHT ASSEMBLY
George H. Weaver, Jr., Newtown, Pa., assignor, by mesne assignments, to Yale & Towne, Inc., New York, N.Y., a corporation of Ohio
Filed Aug. 14, 1963, Ser. No. 302,062
2 Claims. (Cl. 214—674)

My invention relates to a novel lift truck having tilting uprights for supporting a vertically moving load carriage.

As will be appreciated by those persons skilled in the art, truck uprights frequently are arranged so that they can be tilted. Thus, while it may be preferable to use the uprights in a vertical position during parts of a load handling operation, the uprights can be tilted rearwardly to place the load carriage and its load nearer to the center of the truck wheel base, particularly when the carriage is in a somewhat elevated position. Thereby, the lift truck and its load may gain better stability, as is of special importance during the travel of the truck.

The constructions of the prior art generally operate quite well, but the extremely novel and simple concept of my invention enables me to utilize tilting uprights to much better effect, and will have a particular advantage when the lift truck is very short.

In my invention, I so pivot a pair of uprights to a truck frame as to tilt in an axis that is positioned a distance above the lower ends or termini of the uprights. Further, I mount ground engaging wheels on a lower end or terminus portion of the uprights so as to support the truck frame through the uprights and their pivot. Those wheels then form the front wheels of the truck, and will move incidental to tilting of the uprights whereby to change the wheel base of the truck. Thus, as a feature of my invention, I stabilize a truck through shifting of the truck wheel base in a forward direction incidental to a rearward tilting movement of truck uprights.

The truck of my invention will be shortened through a movement of the uprights to vertical position, enabling the truck to maneuver very well in close quarters, when that is desired. Actually, the main frame of my truck my be extremely short, it being possible to achieve the necessary stability through the particular mounting of the uprights and front wheels when the truck is to travel from one place to another.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing:
FIG. 1 shows a perspective view of my novel truck.
FIG. 2 shows a side view.
FIG. 3 is like FIG. 2 but illustrates the operation of my invention.

Referring now more particularly to the drawing, my novel lift truck has a main frame 10 and an upright assembly 11 arranged at the front end of the frame 10.

In the construction that I have chosen to illustrate, the main frame 10 has opposed side plates 12, only one of which is visible in the drawing, also a rear operator's platform 13, and a battery compartment 14 that is arranged on a medial part of frame 10. A steering and traction wheel 15 is mounted on the main frame 10 and forms a rear wheel for the truck. I show controls 16, 17 for the steering and traction wheel 15. Actually, the details whereby that wheel 15 is mounted and controlled are not important to an understanding of my invention, and it is merely necessary to know that the truck has one or more rear wheels 15 that are mounted on the main frame 10.

The upright assembly 11 includes a pair of uprights 18 on which a lifting carriage 19 is mounted, as through conventional secondary uprights 20, FIG. 1, so as to slide vertically upon actuation of lifting chains 21. I show the carriage 19 equipped with load engaging forks 22.

In my invention, I mount the upright assembly 11 through a pivot shaft 23 that is arranged in a transverse position a considerable distance above the lower end or terminus of upright assembly 11. For the particular purpose, I assemble pivot shaft 23 on a bracket 24 welded to each truck upright 18, and I mount each end of the pivot shaft 23 to a front end portion 25 on a frame side plate 12, it being understood that the construction at the side of the truck which is not visible in the drawing is like the side that is shown. Thereby, I mount the uprights 18 for fore-and-aft tilting movement in an axis that is positioned a distance above the lower end or terminus of those uprights.

I equip the lower end portions or terminus of the uprights 18 with a pair of load wheels 26 on mountings 27. The axis of the wheels 26 is forward of the axis of the pivot 23 when the uprights 28 are vertical. The axis of the wheels 26 is located horizontally between the forward and rear vertical edges of the uprights. Thus, the load wheels 26 will directly support the upright assembly 11, but also will act through uprights 18 and pivot shaft 23 to support the front end of the main frame 10 as far forward as possible. It will thus be seen that the wheels 26 form front wheels for my truck, supporting the front end of the truck while the upright assembly 11 moves to different tilted positions with improved stability of the truck and load.

Further, I utilize a hydraulic ram 28 which will act horizontally in opposed directions between the upright assembly 11 and the main frame 10, that ram 28 preferably being pivoted to lower portions of the truck frame 10 and at the lower terminus of the uprights 18. When actuated, ram 28 will tilt the upright assembly 11 about pivot shaft 23. Moreover, the upright assembly 11 when tilting will move the front truck wheels 26 relatively to rear wheel 15 so as to change the wheel base of the truck. If we assume that upright assembly 11 first is in a vertical position, as shown in FIG. 2, a rearward tilting movement of the upright assembly 11 will move the front wheels 26 of the truck in a forward direction, as indicated in FIG. 3, lengthening the truck wheel base. That in effect will shift the center of the wheel base in a forward direction incidental to rearward tilting of upright assembly 11. Thus, even though the truck may be very short, the tilting of the uprights will act with much better effect to improve the stability of the truck and load. Moreover, the ram 28 acts substantially horizontally in line with the line of collision and vertically in line with the axis of the wheels 26.

When it is necessary to maneuver or to engage a load in close quarters, the ram 28 may be actuated to tilt the upright assembly 11 in a forward direction. That will cause the front wheels 26 of the truck to move rearwardly, also retracting the load forks 22 so that the truck in effect will be shorter and can operate in a relatively small space.

It will be seen also that the upright assembly 11 will tilt while only that part of the assembly which is above or below the pivot 23 moves toward the truck frame 10. Thereby the upright assembly 11 can tilt through a relatively wide angle even though the truck be constructed to allow a relatively small clearance between the assembly 11 and truck frame 10.

Those persons skilled in the art will now understand the manner in which my novel lift truck operates, and the advantages that it possesses over the constructions of the prior art. I believe, therefore, that the very considerable merits of my invention will be fully appreciated.

I now claim:

1. In a truck of the class described, a main frame, an upright assembly including a pair of vertical uprights on which a load carriage is mounted for vertical lifting movement, means pivotally mounting said upright assembly on the forward end of said main frame substantially above the lower terminus of said upright assembly for fore and aft tilting movement of the uprights relative to said frame, front wheels for the truck, means mounting said front wheels at the lower terminus of said upright assembly with the axis of the front wheels being forward of the axis of the pivotally mounting means when the uprights are in a vertical position, ram means acting substantially horizontally between the main frame and said upright assembly to tilt said upright assembly from a vertical position to a tilting position, means mounting the forward end of said ram means at the lower terminus of said upright assembly, wheel means for supporting the rear end of said main frame, said front wheels moving relatively to the rear wheel means when said uprights are tilted from a vertical position to thereby increase the wheel base of the truck while said ram means is maintained substantially horizontally in line with the line of collision and vertically in line with the axis of the front wheels of said truck.

2. In a truck of the class described, a main frame, an upright assembly including a pair of vertical uprights on which a load carriage is mounted for vertical lifting movement, means pivotally mounting said upright assembly on the forward end of said main frame substantially above the lower terminus of said assembly for fore and aft tilting movement of the uprights relative to said frame, front wheels for the truck, means mounting said front wheels on the lower terminus of said upright assembly with the axis of the front wheels being positioned horizontally between the forward and rear edges of the uprights when the uprights are in a vertical position, ram means acting substantially horizontally between the main frame and said upright assembly to tilt said uprights from a vertical position to a tilting position, means mounting the forward end of said ram means to said upright assembly, said ram mounting means and said wheel mounting means being secured at substantially the same vertical distance below the upright mounting means, a wheel means for supporting the rear end of said main frame, said front wheels moving relatively to the rear wheel means when said uprights are tilted from a vertical position to thereby increase the wheel base of the truck while said ram means is substantially horizontally in line with the line of collision and vertically in line with the axis of the front wheels of said truck.

References Cited by the Examiner

UNITED STATES PATENTS

| 2,439,139 | 4/1948 | Le Tourneau | 214—660 |
| 3,071,270 | 1/1963 | Baker | 214—674 |

FOREIGN PATENTS

| 1,148,019 | 12/1957 | France. |
| 1,047,719 | 12/1948 | Germany. |
| 1,054,917 | 4/1959 | Germany. |
| 1,065,328 | 9/1959 | Germany. |

GERALD M. FORLENZA, *Primary Examiner.*

MORRIS TEMIN, HUGO O. SCHULZ, *Examiners.*